United States Patent [19]
Li et al.

[11] Patent Number: 5,145,943
[45] Date of Patent: Sep. 8, 1992

[54] PRODUCTION OF PARTICULATE AMIDE/IMIDE PREPOLYMERS

[75] Inventors: Hsueh M. Li; John Y. Lee, both of Baton Rouge, La.

[73] Assignee: Ethyl Corporation, Richmond, Va.

[21] Appl. No.: 628,647

[22] Filed: Dec. 17, 1990

[51] Int. Cl.$^5$ .................. C08G 73/14; C08G 69/28; C08L 77/10; C08L 79/08

[52] U.S. Cl. .................................. 528/353; 528/125; 528/126; 528/128; 528/170; 528/172; 528/173; 528/176; 528/183; 528/188; 528/220; 528/229; 528/310; 528/312; 528/332; 528/350; 528/351; 525/282; 525/436

[58] Field of Search ............... 528/353, 126, 125, 310, 528/128, 220, 170, 229, 172, 350, 173, 351, 170, 183, 188, 332; 525/436, 282

[56] References Cited

U.S. PATENT DOCUMENTS

| | | | |
|---|---|---|---|
| 3,528,950 | 9/1970 | Lubowitz | 528/353 |
| 4,075,171 | 2/1978 | D'Alelio | 528/353 |
| 4,956,450 | 9/1990 | Lee et al. | 528/353 |
| 4,973,661 | 11/1990 | Lee et al. | 528/353 |
| 5,015,727 | 5/1991 | Riel et al. | 528/353 |
| 5,041,526 | 8/1991 | Riel et al. | 528/125 |
| 5,041,527 | 8/1991 | Riel et al. | 528/125 |
| 5,041,528 | 8/1991 | Riel et al. | 528/125 |

FOREIGN PATENT DOCUMENTS 1255935 12/1971 United Kingdom .

OTHER PUBLICATIONS

CA 73: 78075e, "Rapidly Hardenable Polyimides".
CA 76: 73183r, "Polyimide Prepolymers".
CA 114: 63792c, "Molded Product for Sliding Parts".
CA 107: 7837g, "Thermosetting Resins".
CA 110: 214137p, "Org. Solv.-Soluble Imide Oligomer Composition".
CA 112: 218178s, "Thermosetting resin Compositions".
CA 110: 193630h, "Storage-Stabb imide Oligomers for heat-res. Polymides".
CA 113: 79900b, "Imide Oligomer Comp. for heat-resistant Polyimides".

Primary Examiner—John Kight, III
Assistant Examiner—P. Hampton Hightower
Attorney, Agent, or Firm—Richard J. Hammond

[57] ABSTRACT

Fusible polyimide powders are prepared by the process of this invention. An amic acid amine is first prepared by treating (n+1) moles of a bis(aminophenyl)methane with n mole of aromatic tetracarboxylic anhdride to produce an aromatic amic acid prepolymer. This prepolymer is then mixed with an unsaturated carbocyclic monoanhydride and the mixture heated to form a reactive end-capped polyamic acid precursor. The resulting composition is thermally treated in order to partially imidize the precursor. The resulting fusible polyimide powder is finally separated.

13 Claims, No Drawings

PRODUCTION OF PARTICULATE AMIDE/IMIDE PREPOLYMERS

FIELD OF INVENTION

This invention relates to production of finely divided polyimide polymers suitable for use in powder coating operations and for forming composites and molded products.

BACKGROUND

Addition curing PMR (polymerization of monomer reactants) of polyimide materials is gaining wide acceptance for matrix resins for high temperature composite structure and engine applications. Considerable cost and weight savings can be achieved by using fiber-reinforced polyimide composites in place of metals currently used in the moderately high temperature zones (up to 600° F.) of aircraft. PMR polyimide materials are traditionally prepared from three monomeric components: an aromatic diamine, a diester-diacid, and an ester-acid endcap, which are mixed in a particular molar ratio to achieve the required molecular weight of the prepolymer. Typical examples of these materials are the monomers used in the production of PMR-15: 4,4'-methylenedianiline (MDA), 3,3',4,4'-benzophenonetetracarboxylic acid methyl ester (BTDE), and 5-norbornene-2,3-dicarboxylic acid methyl ester (NDE) with molar ratio of 3:2:2. In practice, an alcohol solution of these monomers is used in a first step to impregnate reinforcing fibers; most of the solvent is driven off, but it is assumed that no chemical reaction occurs at this stage. In the next stage of the process, the impregnated materials are heated to initiate the condensation reactions that give the amide and imide prepolymers. During the third and final stage of the process, the material is heated under pressure to a temperature adequate to initiate the addition crosslinking reaction of the norbornenyl endcaps.

The conventional PMR-15 approach has several severe limitations: (i) The traditional PMR-15 material is supplied as a prepregging varnish. The alcohol varnish contains three monomers that are reacted after prepregging, resulting in the amic acid which is then imidized to form a nadic end-capped prepolymer at 100°-250° C. In the idealized sequence, these condensation reactions are complete prior to the thermal crosslinking step; however, it has been reported recently in literature that in many processing situations, these three monomers may not completely react as theoretically expected and will yield a complex mixture of reaction products because it is difficult to precisely control the stoichiometry of three different monomeric components due to different levels of impurities and difference in chemical reactivities. Further, there is no easy way to monitor the reaction of the PMR approach. (ii) One of the monomers, MDA, which is normally present at a level of 30 wt% of solid in the prepregging varnish and may not completely react, is now receiving more attention because it is a suspected human carcinogen. Most recently, OSHA proposed new standards for exposure of workers to MDA, including the 8-hour time-weighted average to 10 parts per billion (ppb) and establishing a short-term exposure limit to 100 ppb. (iii) The process of traditional PMR-15 is very dependent on the manufacturing technique as well as on the part thickness. That is why after 15 years since the PMR-15 approach was disclosed, people are still reporting on how to process this resin system. (iv) Reproducibility in both the processing and final properties of this resin have been very poor. (v) A major weakness of traditional PMR-15 polyimides is poor toughness. A novel process which could eliminate these weak points of a traditional PMR approach and could produce better quality materials over PMR materials would be welcome.

This invention provides a process for the production of norbornenyl-capped amide/imide prepolymers, in solution or in particulate form, derived from three reactants: aromatic diamine, dianhydride, and nadic or maleic anhydride. The process comprises several sequential steps so that the reactions of the three monomeric components could be better controlled and monitored and, consequently, the aforementioned weaknesses of PMR approach could be eliminated and the quality-control of the end-capped prepolymer would be improved.

In a recently filed application, Ser. No. 523,349, filed May 14, 1990, polyimide powders are disclosed as being produced from a process whereby an aromatic fluorine-containing diamine is first treated with an end-capping agent and, in a second step, the product of such treatment is reacted with an aromatic dianhydride. After chemically imidizing, the polyimide powder is separated.

SUMMARY OF THE INVENTION

This invention provides a process for the production, in particulate form, of reactive end-capped amide/imide prepolymers derived from MDA as the sole or predominant aromatic primary diamine component and comprises several sequential steps. As Step 1, the diamine component is reacted with a dianhydride in an organic solvent at ambient temperature to form a solution of oligomeric amic acid. The molar ratio of diamine/dianhydride is about 2.0 to 1.15, preferably 1.5 to 1.2. The resulting amic acid oligomer end-capped with amino groups is then reacted with nadic anhydride to form norbornenyl-capped amic acid prepolymers (Step 2). The equivalent ratio of aromatic diamine to the combination of dianhydride and nadic anhydride is about 1:1. In Step 3, the norbornenyl-capped amic acid prepolymer is then warmed up to about 130°-160° C. for an appropriate period of time to appropriate period of time to have about 30 to 80% imidization, preferably 40 to 70% imidization. As a final step, the solution of Step 3 is cooled to ambient temperature and added to water to precipitate the norbornenyl-capped amide/imide prepolymer. The powdered product is filtered and dried.

DESCRIPTION OF THE PREFERRED EMBODIMENT

The fusible powders are prepared in a number of sequential steps, the first being (Step 1) the preparation of oligomeric amic acids end-capped with amino groups. In this embodiment, an aromatic diamine component such as MDA is reacted with a dianhydride such as 3,3',4,4'-benzophenonetetracarboxylic dianhydride (BTDA) in an organic polar solvent at ambient temperature to form a solution of oligomeric amic acid end-capped with amine groups. The molar ratio of diamine/dianhydride is about 2.0 to 1.15, preferably 1.5 to 1.2. Such molar ratio is responsible for obtaining an oligomeric amic acid having amino groups at chain ends. The reaction is monitored using NMR (nuclear magnetic resonance) spectroscopic analysis to make sure the anhydride groups are reacted. The reaction of Step 1 is illustrated below:

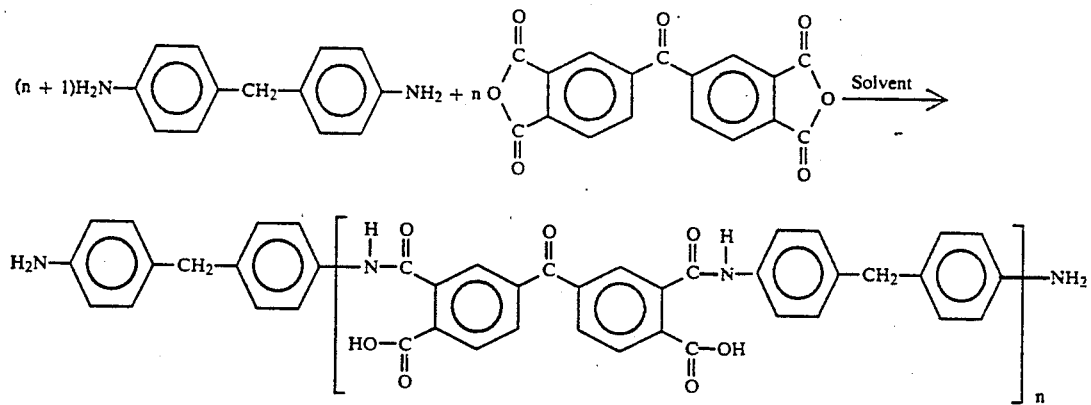

where n is an integer from 2 to about 8.

As the second step (Step 2) in the production of the fusible reactive end-capped amide/imide prepolymer powders of the present invention, the amine end-capped oligomeric amic acid solution prepared as disclosed above is reacted with an unsaturated carbocyclic monomeric anhydride to form unsaturated carbocyclic-capped amic acid prepolymers. The equivalent ratio of aromatic diamine to the combination of dianhydride and unsaturated anhydride is from about 1.0:1.0 to about 1.0:1.05 with about 5 mole % excess of unsaturated anhydride to ensure that the amine groups are fully reacted. The reaction of Step 2 is illustrated below (using nadic anhydride):

where R is $C_1$ to $C_6$ linear or branched alkyl, halo or maleic anhydride and its $C_1$ to $C_6$ linear or branched alkyl derivatives

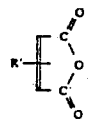

where R' is the same or different than R described above. Mixtures of the above compounds may also be used. The R and R' groups in these monomeric anhydrides include both mono-substituted compounds as well as disubstituted ones. Thus, compounds such as methyl maleic anhydride (citraconic anhydride) or dimethyl maleic anhydride as well as 5-methyl-5-norbornene-2, 3-dicarboxylic anhydride or 5,6-dimethyl-5-norbornene-2, 3-dicarboxylic anhydride are useful herein.

In Step 3, the unsaturated carbocyclic-capped amic acid prepolymer is then warmed up to about 130° to 180° C., preferably 135° to 160° C., for an appropriate period of time to partially imidize the prepolymer, i.e.,

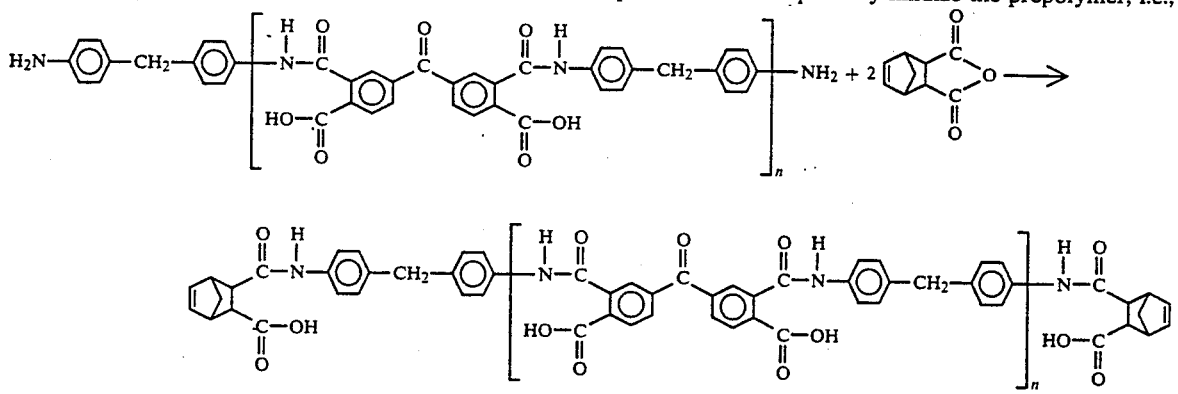

The unsaturated carbocyclic monomeric anhydrides of use in this embodiment of the present invention are nadic anhydride (5-norbornene-2,3-dicarboxylic anhydride) and its halogen or $C_1$ to $C_6$ linear or branched alkyl derivatives, i.e.,

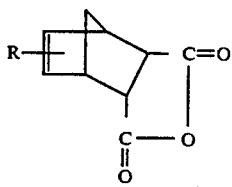

30 to 80%, preferably 40 to 70% imidization. The reasons for keeping imidization below 80% are: (i) to allow imidized product solubility in the solution so that it can be used readily for casting or coating and (ii) to keep the melting temperatures of the imidized product (powder) below 280° C., preferably below 260° C., which is lower than the crosslinking temperature (300°-340° C.) of the norbornenyl groups. It is desirable to have a wide enough processing window, preferably greater than 20° C., for molding operation. The level of imidization is monitored by NMR analysis. A typical thermal imidization of the norbornenyl-capped amic acid prepolymer is illustrated below:

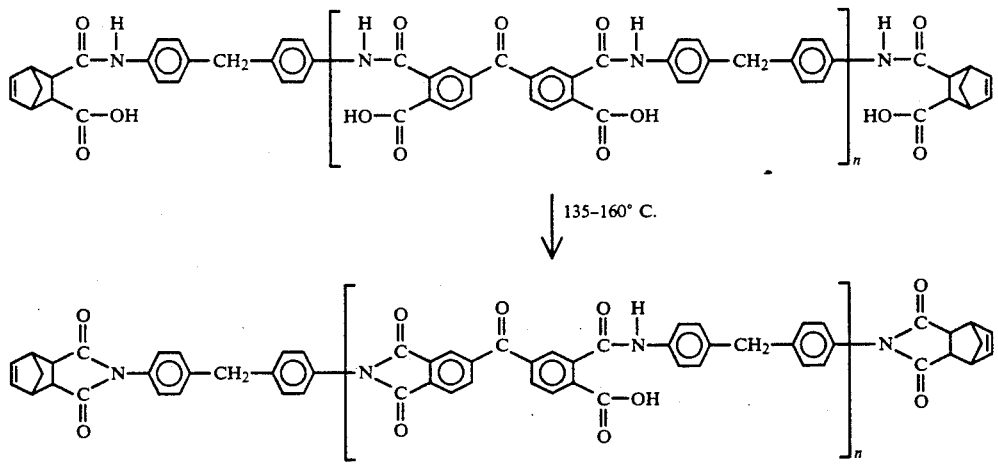

↓ 135–160° C.

As a final step, Step 4, the solution of Step 3 is cooled to ambient temperature and gradually poured into water or other organic non-solvent, which is miscible with the solvent used in the reaction, under agitation to precipitate the norbornenyl-capped amide/imide prepolymer. The powdered product is filtered and dried. The particulate prepolymer may be separated or recovered from the liquid medium by any suitable procedure, such as filtration, decantation, vacuum distillation or centrifugation.

After drying the product under vacuum or under a flow of air or inert gas (e.g., nitrogen) at a temperature in the range of 25° to 100° C. to remove most of residual quantities of water and solvent(s), the particulate prepolymer powder is typically subjected to a final drying in a vacuum oven at 100°–150° C. to remove the solvent from the prepolymer particles.

Examples of solvents which are suitable for use in the formation of the precursor include the dipolar aprotic ones such as N,N-dimethylformamide, N,N-dimethylacetamide, N,N-diethyl-formamide, N,N-diethylacetamide, N-methylpyrrolidone, dimethylsulfoxide, sulfolane, and the like, including mixtures of two or more such solvents.

Other solvents, such as ketones, ethers, and the like may also be included in the solutions formed above, provided that such co-solvents do not prevent the polyimide from precipitating from solution in proper physical form during the course of the ensuing thermal dehydration reaction in Step 3.

A feature of this invention is that no reaction intermediate, e.g., the reaction product of Step 1, need be recovered or isolated, and the entire reaction can be, and preferably is, conducted in the same reactor, in effect as a one-stage unit operation.

The aromatic tetracarboxylic dianhydrides which may be employed in the process may be represented by the formula

where A is an aromatic group. Illustrative compounds of this type include:
pyromellitic dianhydride;
3,3',4,4'-benzophenonetetracarboxylic dianhydride (BTDA);
2,2-bis(3,4-dicarboxylphenyl)hexafluoropropane dianhydride;
4,4'-oxydiphthalic anhydride;
2,3,6,7-naphthalenetetracarboxylic dianhydride;
1,2,5,6-naphthalenetetracarboxylic dianhydride;
2,2-bis(3,4-dicarboxylphenyl)propane dianhydride;
1,1-bis(3,4-dicarboxylphenyl)propane dianhydride;
1,1-bis(3,4-dicarboxylphenyl)ethane dianhydride;
bis(3,4-dicarboxylphenyl)methane dianhydride;
3,4,9,10-perylenetetracarboxylic acid dianhydride; and
3',3',4,4'-biphenyltetracarboxylic dianhydride.

Mixtures of two or more such illustrative dianhydrides are also useful reactants. Pyromellitic acid dianhydride, 2,2-bis(3,4-dicarboxyphenyl)hexafluoropropane dianhydride, and 3,3',4,4'-benzophenonetetracarboxylic acid dianhydride are particularly preferred reactants.

Typically, to the reaction product of Step 1 nadic anhydride or maleic anhydride is added at an equimolar ratio to that of the unreacted amino group.

It is preferred that the molar ratio of carbocyclic monoanhydride: bis-(aminophenyl)methane: aromatic tetracarboxylic dianhydride is from about 2:3:2 to about 2:9:8.

Small amounts of the corresponding tetracarboxylic acid monoanhydride may be present in the reaction system, either as the customary impurity in commercial grades of the dianhydride or as a deliberately added component. The amount present usually will not exceed about 5 mole % of the dianhydride.

In lieu of or in addition to the tetracarboxylic dianhydride, use may be made of its acid halides or esters as reactants in the process.

In a preferred embodiment, a homogeneous solution in Step 2 above is formed by stirring or otherwise agitating the mixture at a temperature of up to about 100° C. It should be noted that the order of addition of the components to the reactor is critical. Preferably this operation is conducted at ambient temperatures.

As illustrated below for two of the carbocyclic monoanhydrides of the present invention, the polyimide precursors (i.e., polyamic acids) resulting from the completion of Steps 2 and 3 may be represented by the following structures:

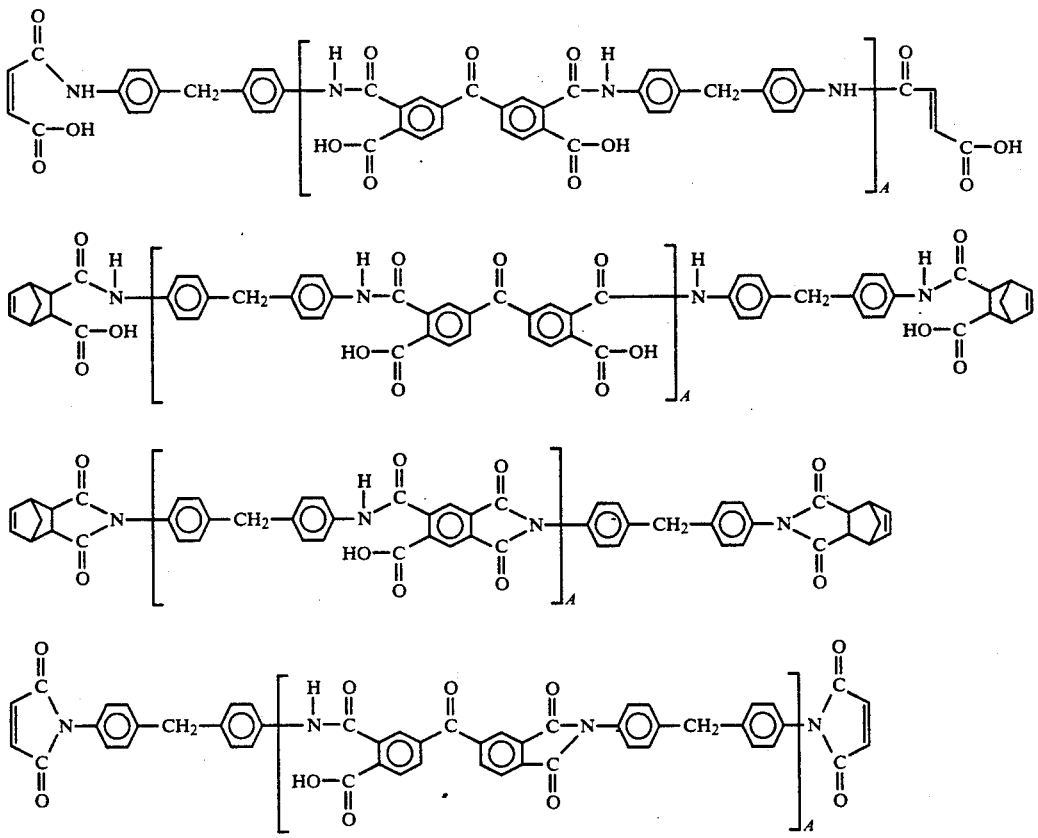

where A is the integer 2 to about 8.

Because the molecular weight of the end-capped polyimide is relatively low, 1500–4000, the imidized material is generally soluble in the solvent used in the reaction. The end-capped polyimide is typically made into a solution with one or more solvents mentioned earlier and poured gradually into a non-solvent such as water under vigorous agitation to cause the polyimide to separate in particulate form and to prevent the formation of excessive quantities of agglomerated particles or masses within the system. The particulate polyimide product is filtered and washed with a suitable non-solvent having a boiling point below about 160° C. (preferably below about 100° C.) and then dried in a vacuum oven at a temperature in the range of 25 to 200° C., preferably in the range of 50° to 175° C. to remove residual quantities of solvent(s).

The diamine portion of the polymers is based on a bis-(aminophenyl)methane, such as bis-(4-aminophenyl)methane or bis-(3-aminophenyl)methane, and mixtures thereof, as the sole or as the predominant (more than 50 mole %) diamine reactant used in producing the polyimide polymer. When forming co-polyimides wherein one or a mixture of bis(aminophenyl)methane constitute the predominant aromatic primary diamine component, the balance (less than 50 mole%) of the aromatic diamine(s) used will be one or more unsubstituted or substituted aromatic or heterocyclic primary diamines such as:
p-phenylenediamine,
m-phenylenediamine,
4,4'-diaminobiphenyl,
3,3'-diaminobiphenyl,
4,4'-methylenedianiline,
4,4'-diaminodiphenylsulfide,
3,3'-diaminodiphenylsulfide,
4,4'-diaminodiphenylsulfone,
3,3'-diaminodiphenylsulfone,
4,4'-diaminodiphenylketone,
3,3'-diaminodiphenylketone,
4,4'-oxydianiline,
3,3'-oxydianiline,
1,4-diaminonaphthalene,
2,6-diaminopyridine,
3,5-diaminopyridine,
2,6-diaminotoluene,
2,4-diaminotoluene,
1,1-bis(3-aminophenyl)ethane,
2,2-bis(4-aminophenyl)propane,
2,2-bis(3-aminophenyl)hexafluoropropane,
2,2-bis(4-aminophenyl)hexafluoropropane,
2,2-bis[4-(3-aminophenoxy)phenyl]hexafluoropropane,
2,2-bis[4-(4-aminophenoxy)phenyl]hexafluoropropane,
and the like.

The particulate prepolymer may be separated or recovered from the liquid reaction medium by any suitable procedure, such as filtration, decantation, vacuum distillation, or centrifugation.

In the preferred washing step of this invention, any inert solvent boiling below about 160° C. (most preferably below about 100° C.) may be employed, including low boiling paraffins, cycloparaffins, chlorinated solvents, ethers, water, ketones, etc., including mixtures of such solvents. It is important that the solvent used for washing be miscible with the aprotic solvent and thus can remove the aprotic solvent from the polymer particles.

After drying the product under vacuum or under a flow of inert gas (preferably nitrogen, although argon, etc., may be used), preferably using staged drying temperatures in the manner described above, the particulate prepolymer powder may be subjected to a final drying in a vacuum tray dryer at a temperature in the range of 50° to about 175° C. and at a pressure in the range of 0 to 20 mm Hg. Ordinarily grinding of the product is not required, but may be resorted to in any situation where it is deemed desirable.

Having described the basic concepts of this invention, reference will now be made to the following specific examples which are illustrative but not limitive of its practice.

EXAMPLES

Example 1

Preparation of MDA/BTDA/NA Amic Acid Solution in DMAc 59.4 g (0.30 mole) of MDA and 480 g of DMAc were placed in a 1 L four-neck round bottom flask equipped with a condenser, thermometer, and a mechanical stirrer. To above MDA solution under agitation, 64.4 g (0.20 mole) of BTDA was added in ten portions into the reaction flask under nitrogen atmosphere over a period of 30 minutes at 25°–35° C. The reaction mixture was stirred at this temperature range for about 6 hours. A small sample of the reaction solution was analyzed by proton NMR analysis which did not show detectable unreacted MDA or BTDA. 32.4 g (0.20 mole) of nadic anhydride was added in 10 portions over a period of 30 minutes into the reactor at 25° to 30° C. The reaction mixture was stirred at this temperature range for an additional 90 minutes. The proton NMR analysis of a small sample of the reaction solution indicated that the end-capping was essentially complete.

Example 2

Thermal Imidization of MDA/BTDA/NA Amic Acid in Solution

About a quarter (by volume) of the reactive end-capped oligomeric amic acid solution from Example 1 was placed in a 300-mL round-bottom flask. The solution was stirred and heated at about 130°–135° C. for about ½ hour and then cooled to ambient temperature. The resulting brown solution was then poured into cold water (the volume of water was about 4 times of that of the brown solution) with stirring to precipitate the imidized oligomer product. The fine powder product was filtered, washed with water, air-dried for 4 hours and then vacuum-dried (70° C. and 30 inch Hg pressure) to yield 34.5 g yellow powder. The proton NMR analysis of the product indicated about 50–60% imidization. The melting temperature range of the powder was about 220° C.

Another quarter of the reactive end-capped oligomeric amic acid solution from Example 1 was heated at 130°–135° C. for about one hour. At the end of the heating, yellow fine particles started to appear from the brown solution. The heating was discontinued. The solution was poured into water to precipitate the imidized oligomer powder. The proton NMR analysis of the imidized product indicated about 70–80% imidization. The powder melted at about 230° C.

Example 3

Compression Molding of the Powder of This Invention

To compare the reactive end-capped oligomeric imide with the traditional PMR-15 resin, several grams of the yellow powder with 50–60% imidization from Example 2 and several grams of the commercially available M-100 imidized PMR-15 powder (brown powder) from Hysol Grafil Composite Components Company were compression molded and cured separately at 600° F. for 30 minutes into several thin specimens (thickness varied from 0.7 to 1.3 mm). The glass transition temperatures (using DMTA method), Tg, of the cured M-100 PMR-15 specimens ranged from 270° to 285° C. while the Tg of the cured specimens from our yellow powder ranged 350° to 360° C. After post-curing for 16 hr at 600° F., 4 hr at 650° F., and 4 hr at 700° F., the Tg of Hysol Grafil's PMR-15 specimens increased to the range of 315° to 345° C. while Tg of our specimens increased to the range of 360° to 370° C.

During compression-molding the powders, we experienced the difficulty of molding the M-100 PMR-15 powder because it became very fluid when it melted and would overflow when a small pressure was applied; therefore, we were not able to mold a ¼ inch thick disk from Hysol Grafil's powder. We did not have difficulty to mold a ¼ inch thick disk from our powder because the melt viscosity of our powder is significantly higher than that of the M-100 PMR-15 powder.

The reactive end-capped oligomeric imide solution will be useful in applications such as high temperature adhesives, coating, and prepregging. The reactive end-capped oligomeric imide powder can be used for compression/transfer resin molding and powder prepregging to produce structure parts.

Example 4

The Comparison Between PMR-15 Powder and Prepolymer Powder of This Invention

Example 3 shows that the glass transition temperatures (Tg) of compression molded specimens, with and without post-cured, from the yellow prepolymer powder of this invention are higher than those of the corresponding specimens from the M-100 PMR-15 powder. Both the prepolymer powder mentioned in Example 3 and the M-100 PMR-15 powder are prepared from similar monomeric components and molar ratio but are prepared via different reaction process. To further demonstrate the differences in the natures of these two powder products, we measured the melt viscosity (RDS measurement) and inherent viscosity ($\eta_{inh}$) of these two powder samples. The results are following:

| Source of Powder | Inherent Viscosity (1.0% in DMAc, 25° C.) | Melt Viscosity (at 250° C.) | |
|---|---|---|---|
| | | time = 0 sec.; | time = 80 sec. |
| M-100 PMR-15 | 0.14 dl/g | $2 \times 10^4$ poise | $3 \times 10^4$ poise |
| This invention | 0.36 dl/g | $3 \times 10^4$ poise | $8 \times 10^6$ poise |

Both inherent viscosity and melt viscosity of the prepolymer powder of this invention are significantly higher than those of commercial PMR-15 powder. That indicates that the process of this invention would produce a prepolymer which has higher average molecular weight than the conventional PMR-15 process. The melt viscosity of the commercial PMR-15 prepolymer increased much less in the span of 80 sec. than that of the prepolymer of this invention. That would explain why we experienced the difficulty for molding a thicker specimen from the commercial PMR-15 powder mentioned in Example 3.

To compare the fracture toughness of the molded and cured neat resin from the prepolymer powder of this invention and conventional PMR-15, the plane-strain fracture toughness ($K_{Ic}$) of compression-molded/cured neat resin from our norbornenyl-capped amide/imide prepolymer powder were determined by use of the compact tension specimen of ASTM 399. The average $K_{IC}$ of three determinations is 846 (psi)(in)$^{\frac{1}{2}}$. According to a paper presented by R. H. Pater and C. D. Morgan at the 1988 SPE ANTEC Technical Conference Apr. 18–21, 1988 (SAMPE Journal, Vol. 24, No. 5, Sept./Oct. 1988, pp 25–32), the neat resin fracture toughness, $K_{Ic}$, of PMR-15 is about 500 (psi)(in)$^{\frac{1}{2}}$.

We claim:

1. A process for the production of aromatic polyimide fusible powders derived from a bis(aminophenyl)methane, said process comprising
   a) treating a solution of
      i) n moles of a bis(aminophenyl)methane,
      ii) n moles of an aromatic tetracarboxylic dianhydride;
   b) admixing the product produced in step a) with an unsaturated carbocyclic monoanhydride selected from the group maleic anhydride, maleic anhydride substituted with halogen or $C_1$ to $C_6$ linear or branched alkyl group, nadic anhydride or nadic anhydride substituted with at least one halogen or $C_1$ to $C_6$ linear or branched alkyl group or mixtures thereof and forming a prepolymer;
   c) partially imidizing the prepolymer of step b) by heating;
   d) the solution of step c) is gradually poured into water or organic non-solvent to precipitate the partially imidized prepolymer;
   e) separating said partially imidized prepolymer as a powder.

2. The process of claim 1 wherein the aromatic tetracarboxylic dianhydride is 3,3',4,4'-benzophenonetetracarboxylic dianhydride or pyromellitic dianhydride, or both.

3. The process of claim 1 wherein said monomeric anhydride is nadic anhydride or maleic anhydride.

4. The process of claim 1 wherein n is 2 to about 8.

5. A process for the production of aromatic polyimide fusible powders comprising
   a) reacting a solution of bis(aminophenyl)methane with an aromatic tetracarboxylic dianhydride selected from the group pyromellitic dianhydride or 3,3',4,4'-benzophenone tetracarboxylic dianhydride and heating the mixture to a temperature that does not exceed 100° C.;
   b) admixing the product of step a) with nadic anhydride or maleic anhydride;
   c) partially imidizing the product of step b); and
   d) separating a fusible polyimide powder.

6. The amide-imide prepolymer of the formula

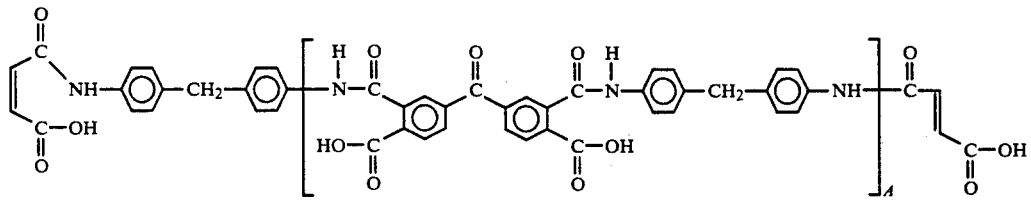

where A is an integer from 2 to 8 prepared by the process of claim 1.

7. The amide-imide prepolymer of the formula

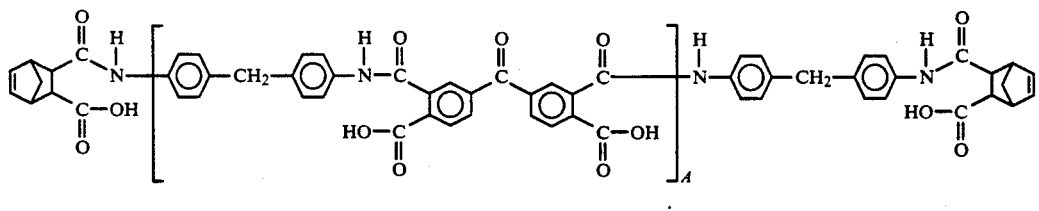

where A is the integer 2 to 8 prepared by the process of claim 1.

8. The amide-imide prepolymer of the formula

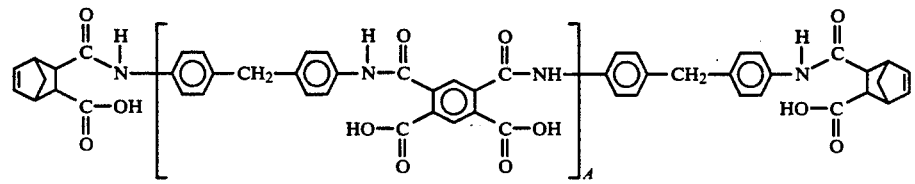

where A is an integer from 2 to 8.

9. The amide-imide prepolymer the formula

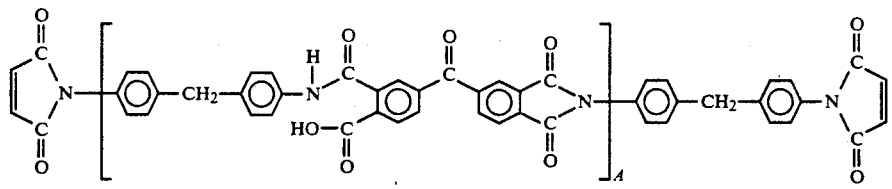
where A is an integer from 2 to 8.
10. The amide-imide prepolymer of the formula
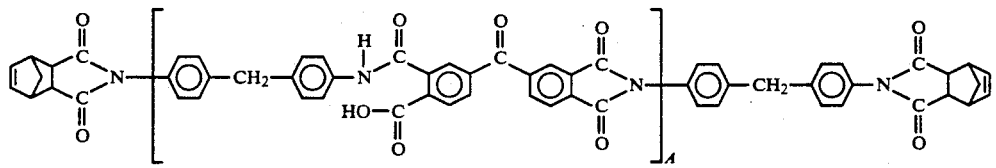
where A is an integer from 2 to 8.
11. The amide-imide prepolymer of the formula
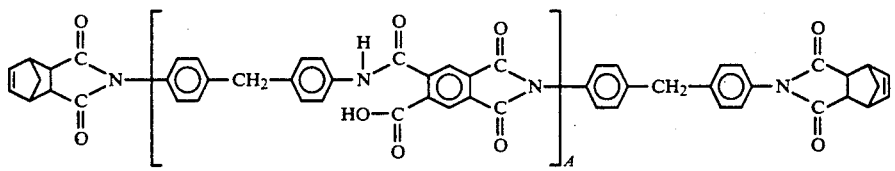
where A is an integer from 2 to 8.
12. The amide-imide prepolymer of the formula
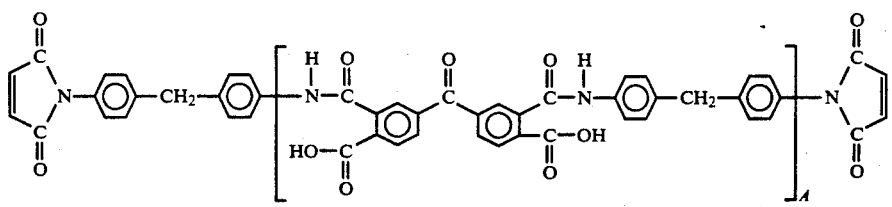
where A is an integer from 2 to 8.
13. The amide-imide prepolymer of the formula
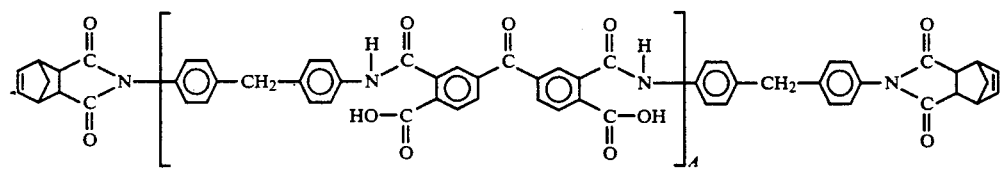
where A is an integer from 2 to 8.
* * * * *